(12) United States Patent
Weiler et al.

(10) Patent No.: US 12,360,919 B1
(45) Date of Patent: Jul. 15, 2025

(54) COMPUTER SYSTEM FOR TRANSPARENT KEY ROLL

(71) Applicant: Idaho Scientific LLC, Boise, ID (US)

(72) Inventors: Andrew James Weiler, Nampa, ID (US); Nathan Charles Chrisman, Nampa, ID (US); Claude Harmon Garrett, V, Meridian, ID (US); Dale Weston Reese, Boise, ID (US)

(73) Assignee: Idaho Scientific LLC, Boise, ID (US)

( * ) Notice: Subject to any disclaimer, the term of this patent is extended or adjusted under 35 U.S.C. 154(b) by 0 days.

(21) Appl. No.: 18/633,206

(22) Filed: Apr. 11, 2024

(51) Int. Cl.
G06F 12/14 (2006.01)

(52) U.S. Cl.
CPC ...... G06F 12/1441 (2013.01); G06F 12/1408 (2013.01)

(58) Field of Classification Search
CPC .......................... G06F 12/1441; G06F 12/1408
USPC ............................................................. 726/6
See application file for complete search history.

(56) References Cited

U.S. PATENT DOCUMENTS

2019/0319781 A1* 10/2019 Chhabra ............... G06F 3/0655
2024/0291635 A1* 8/2024 Morshed ............... H04L 9/0894

OTHER PUBLICATIONS

Congwu Li, Le Guan; Mimosa: Protecting Private Keys Against Memory Disclosure Attacks Using Hardware Transactional Memory; IEEE: year:2015; pp. 1196-1213.*

* cited by examiner

*Primary Examiner* — Monjur Rahim
(74) *Attorney, Agent, or Firm* — Workman Nydegger (57) ABSTRACT

Rolling encryption within a memory region. A method includes storing data in a first encrypted memory portion in the memory region. The data in the first encrypted memory portion is encrypted to a first runtime encryption key. Data is stored in a second encrypted memory portion in the memory region. The data in the second encrypted memory portion is encrypted to a second runtime encryption key. A pointer is stored. The pointer defines a boundary between the first encrypted memory portion and the second encrypted memory portion. The first encrypted memory portion and second encrypted memory portion are both configured to be accessible together to entities external to the memory to provide data stored in the first encrypted memory portion and second encrypted memory portion.

20 Claims, 7 Drawing Sheets

COMPUTER SYSTEM FOR TRANSPARENT KEY ROLL

GOVERNMENT SUPPORT

This invention was made with government support under contract no. FA864921P1575, awarded by USAF. The government has certain rights in this invention.

BACKGROUND

Background and Relevant Art

Computers and computing systems have affected nearly every aspect of modern living. Computers are generally involved in work, recreation, healthcare, transportation, entertainment, household management, etc.

Computer memory can be encrypted using a runtime encryption key (i.e., and encryption key used during runtime of the data and/or instructions stored in the memory) and an encryption process. In particular, data or instructions stored in memory are stored as digital blocks in an encrypted format. In particular, clear text data or instructions are used as (at least a portion of) input data or instructions into an encryption process. The input data or instructions are encrypted using the encryption process applying the runtime encryption key to the input data or instructions to create an encrypted output digital block. The encrypted output digital block is then stored in memory, such that the encrypted output digital block stored in memory is not readable absent access to the runtime encryption key.

Runtime encryption keys wear out. This is because if an encryption process is observed long enough, the runtime encryption key can be deduced. For example, if data or instructions input into an encryption process using a secret runtime encryption key is known, and encrypted output digital blocks from the encryption process can be observed, after a certain number of encryption operations, the runtime encryption key can be deduced by observing the input data or instructions and encrypted output digital block and identifying certain patterns, particularly when the same input data or instructions are encrypted multiple times.

Often an encryption process will use a nonce (i.e., a unique number) applied as part of the input data or instructions to increase the number of times a runtime encryption key can be used before the runtime encryption key wears out. By applying the nonce as part of the input data or instructions, input data or instructions input into the encryption process will always be unique, and thus, the runtime encryption key cannot be deduced. However, nonce values are limited. For example, if a nonce value is a 31 bit number, there are only $2^{31}$ possible nonce values. Thus, once all nonce values have been used, a new runtime encryption key is used to prevent deduction of the runtime encryption key.

To use the new runtime encryption key, the data or instructions in the memory are recovered from an encrypted digital block in the memory using the original runtime encryption key, re-encrypted with the new key, and re-stored in the memory. Before the data or instructions can be accessed again by entities external to the memory, all data or instructions encrypted by the original runtime encryption key have to be re-encrypted to the new runtime encryption key. That is, typically a runtime encryption key is used for a memory region and once a key has worn out for the memory region, access to the memory region is paused until all data or instructions stored in encrypted digital blocks in the memory region can be recovered and re-encrypted to new encrypted digital blocks using a new runtime encryption key.

This re-encryption process can take a significant amount of time. A system will typically need to freeze while this re-encryption is occurring. Therefore, such re-encryption systems cannot be used in safety critical applications, such as avionics, healthcare, self-driving vehicles, etc.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a memory encryption environment. The method includes acts for rolling encryption within a memory region. The method includes storing data in a first encrypted memory portion in the memory region. The data in the first encrypted memory portion is encrypted to a first runtime encryption key. Data is stored in a second encrypted memory portion in the memory region. The data in the second encrypted memory portion is encrypted to a second runtime encryption key. A pointer is stored. The pointer defines a boundary between the first encrypted memory portion and the second encrypted memory portion. The first encrypted memory portion and second encrypted memory portion are both configured to be accessible together to entities external to the memory to provide data stored in the first encrypted memory portion and second encrypted memory portion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
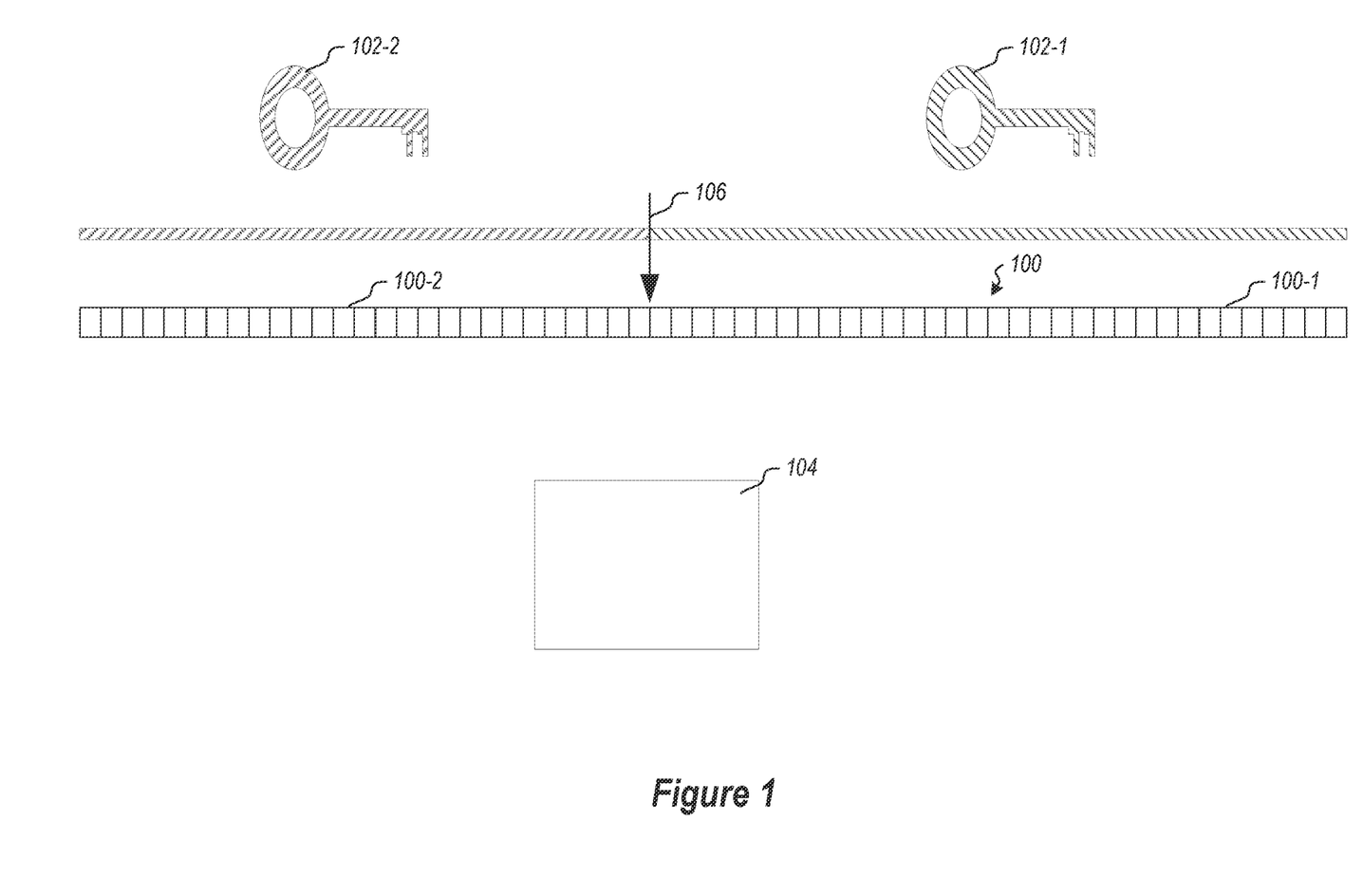
FIG. 1 illustrates a memory region divided into two portions, each portion being encrypted to a different encryption key, and where the two portions are separated by a pointer, and where the two portions are both accessible to an external entity.

Embodiments illustrated herein implement a key rolling process whereby two or more keys can be used at a given time for the same memory region and where that memory region is nonetheless available to entities external to the memory region while the memory region is encrypted with the two or more keys. An example of this is illustrated in FIG. 1. FIG. 1 illustrates a memory region 100. The memory region 100 has two portions including a first portion 100-1 and a second portion 100-2. The first portion 100-1 is encrypted using a first cryptographic key 102-1, while the second portion 100-2 is encrypted using a second cryptographic key 102-2.

An external entity 104 is able to access both the first portion 100-1 and the second portion 100-2. That is, the memory region 100 does not need to be completely encrypted using a single key for it to be accessible by the external entity 104. Rather, the memory region 100 can be encrypted with different portions encrypted using different cryptographic keys, and nonetheless the entirety of the memory region 100 is available to the external entity 104. The external entity 104 may be for example an application, computing system, and/or other apparatus.

FIG. 1 further illustrates a pointer 106. The pointer 106 is a data structure stored in a computing system that identifies a boundary between the first portion 100-1 and the second portion 100-2. The pointer 106 may be implemented in any one of a number of different fashions. For example, in some embodiments, the pointer may identify a last address of the first portion 100-1. Alternatively, the pointer 106 may identify a first address of the second portion 100-2.

In some embodiments, the memory region 100 is divided into slots, and the pointer 106 can be used to identify which slots are encrypted using which key. In some embodiments, the memory region 100 will have an incremental key roll performed on the memory region 100. In particular, at the happening of some event, a key is rolled for a slot, and the pointer 106 is moved to a next slot. This continues until all of the memory region 100 has been rolled from the first key 102-1 to the second key 102-2. Once the memory region has been rolled to the second key 102-2, the process can start over with yet another new key to roll from the second key 102-2 to the another new key.

Figure 2:
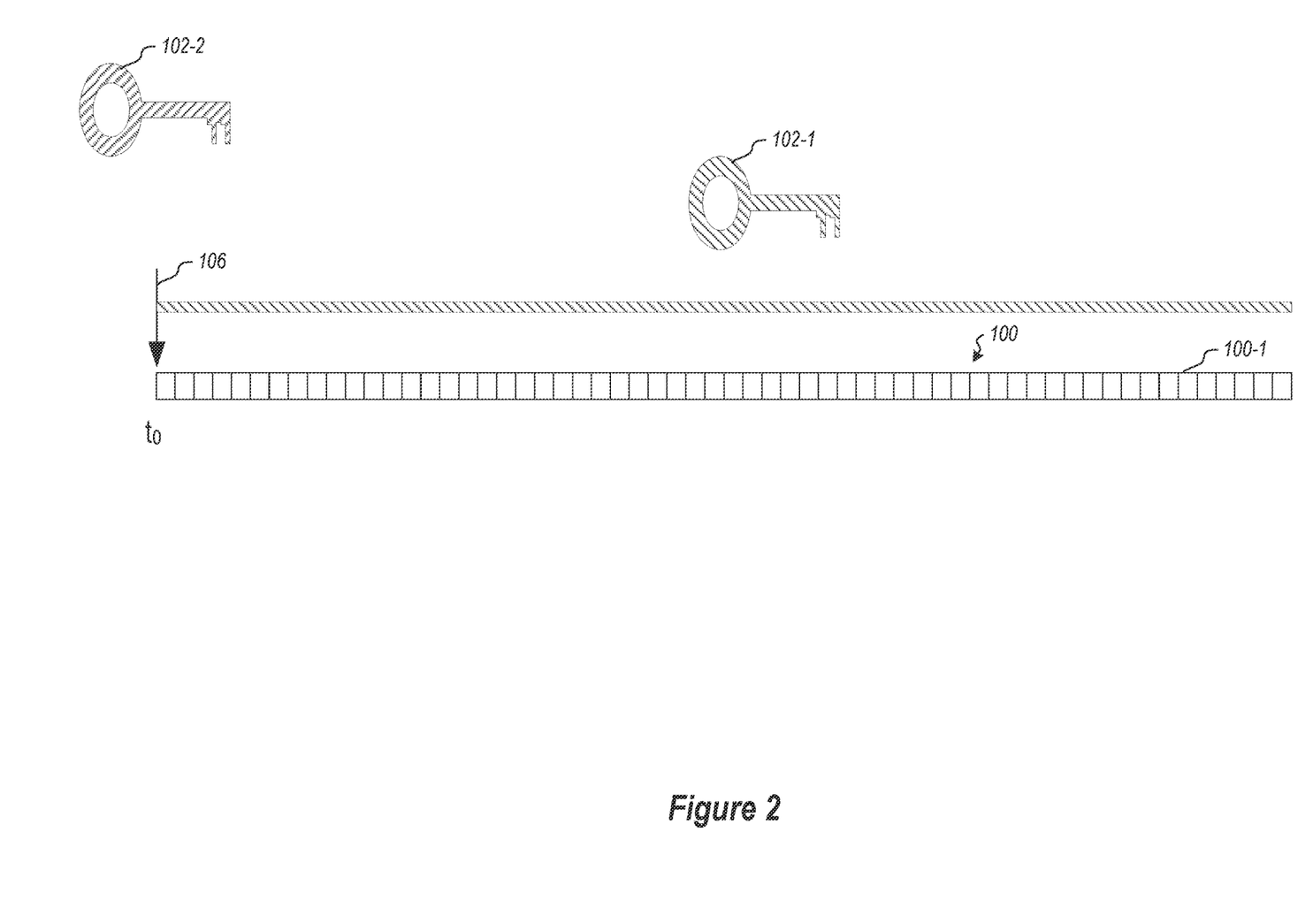
FIG. 2 illustrates the memory region, but where the entirety of the memory region is encrypted to only a single key.
Figure 3:
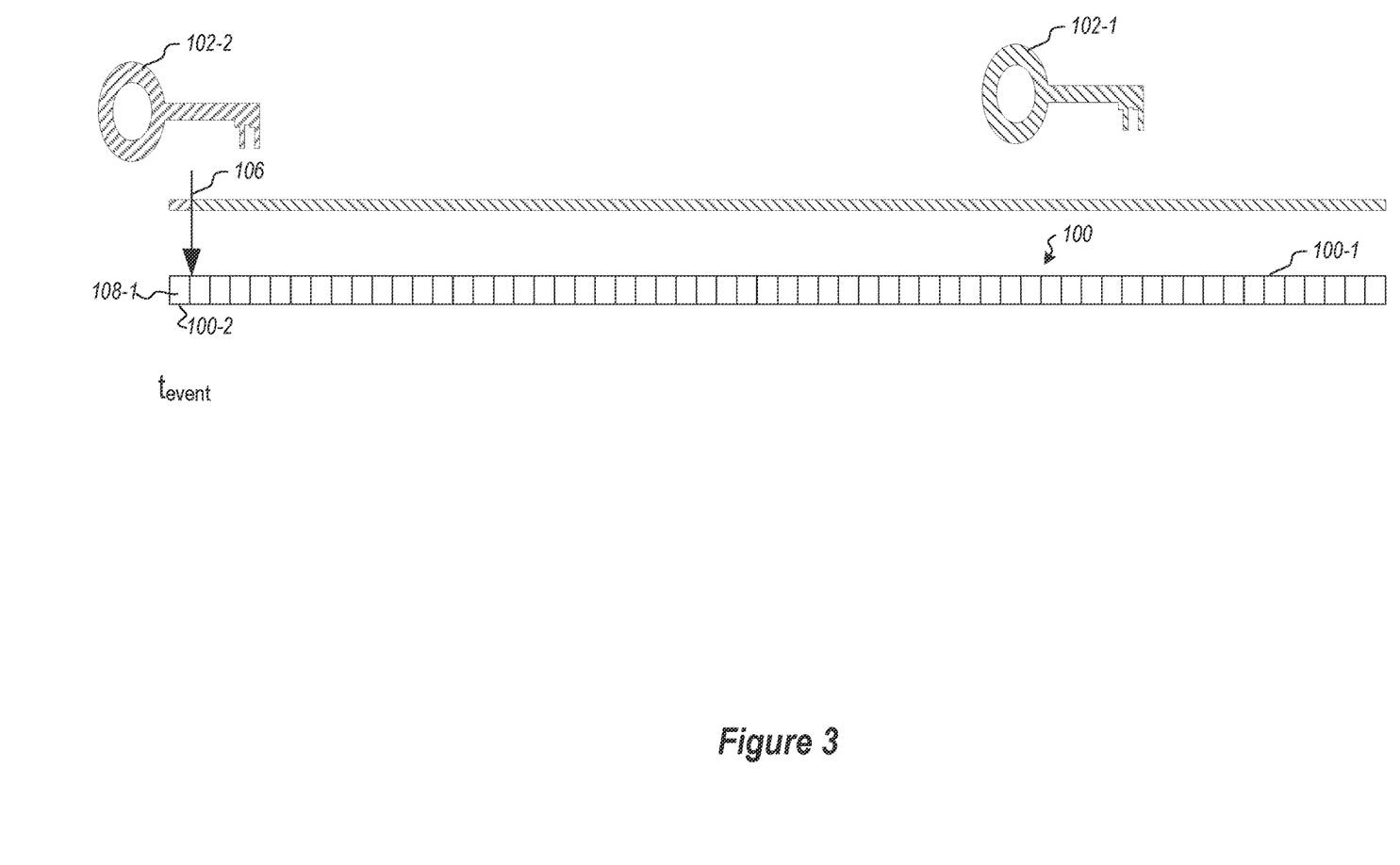
FIG. 3 illustrates the memory region where a slot has had a key rolled from a first encryption key to a second encryption key.

Reference is now made to FIG. 2 and FIG. 3 which illustrates certain functionality. In FIG. 2, the memory region 100 is at a beginning time indicated as time $t_0$. At this point, the entirety of the memory region 100 is encrypted using the first key 102-1. As illustrated in FIG. 3, at some event time $t_{event}$, the slot 108-1 is then encrypted to the second key 102-2, and the pointer 106 is moved. This process continues at the happening of subsequent events until the entirety of the memory region 100 is encrypted to the second key 102-2, after which the process resets with a new runtime encryption key to roll the second runtime encryption key 102-2 to the new runtime encryption key in the same manner as previously illustrated.

The event that causes the pointer 106 to shift can be any one or more of a number of different events. For example, in some embodiments, the event is the expiration of some predetermined amount of time. However, more commonly, the event will be related to a number of memory write operations that have been performed on the memory region 100 (at any location of the memory region, i.e., not just at the pointer location). In particular, it is desirable to have re-encrypted the entirety of the memory region 100 prior to the first runtime encryption key 102-1 "wearing out". That is, it is desirable to have rolled to the new runtime encryption key 102-2 before a number of writes have been performed using the encryption key 102-1 that would allow an attacker to deduce the runtime encryption key 102-1.

In some embodiments, the number of memory write operations which cause the pointer 106 to shift is related to the number of slots in the memory region 100 and the total number of memory writes that can occur before a key is to be considered "worn-out". For example, assuming that there are two keys, 1000 slots in the memory region 100, and that a key is worn out after 1 million write operations, embodiments may be configured to move the pointer 106 one slot every 500 memory writes so that the entirety of the memory region 100 is rolled from one key to the next in half of the total number of writes it takes to wear out a single key. This is a worst case scenario, but ensures that neither of the keys is worn out, even in this worst case scenario.

Note that while the embodiment illustrated above moves the pointer in one slot steps, it should be appreciated that other embodiments may be implemented. For example, embodiments may be implemented where multiple slots have keys rolled in a given key roll operation, where a given key roll operation can be defined, for example, by a single change of the pointer. Indeed, the number of slots may be variable, such that in some operations more slots have keys rolled than other operations and vice versa.

Still in other embodiments, keys may be rolled in variable amounts of time or memory writes so long as all slots have keys rolled in a sufficient amount of time or in a sufficient number of writes to prevent a key from wearing out. In some embodiments, this means that all slots in a memory region have keys rolled in some period of time or some quantity of memory operations where no more than a number of operations, equal to half of the number of operations to wear out a key, have been performed on the memory region.

Figure 4:
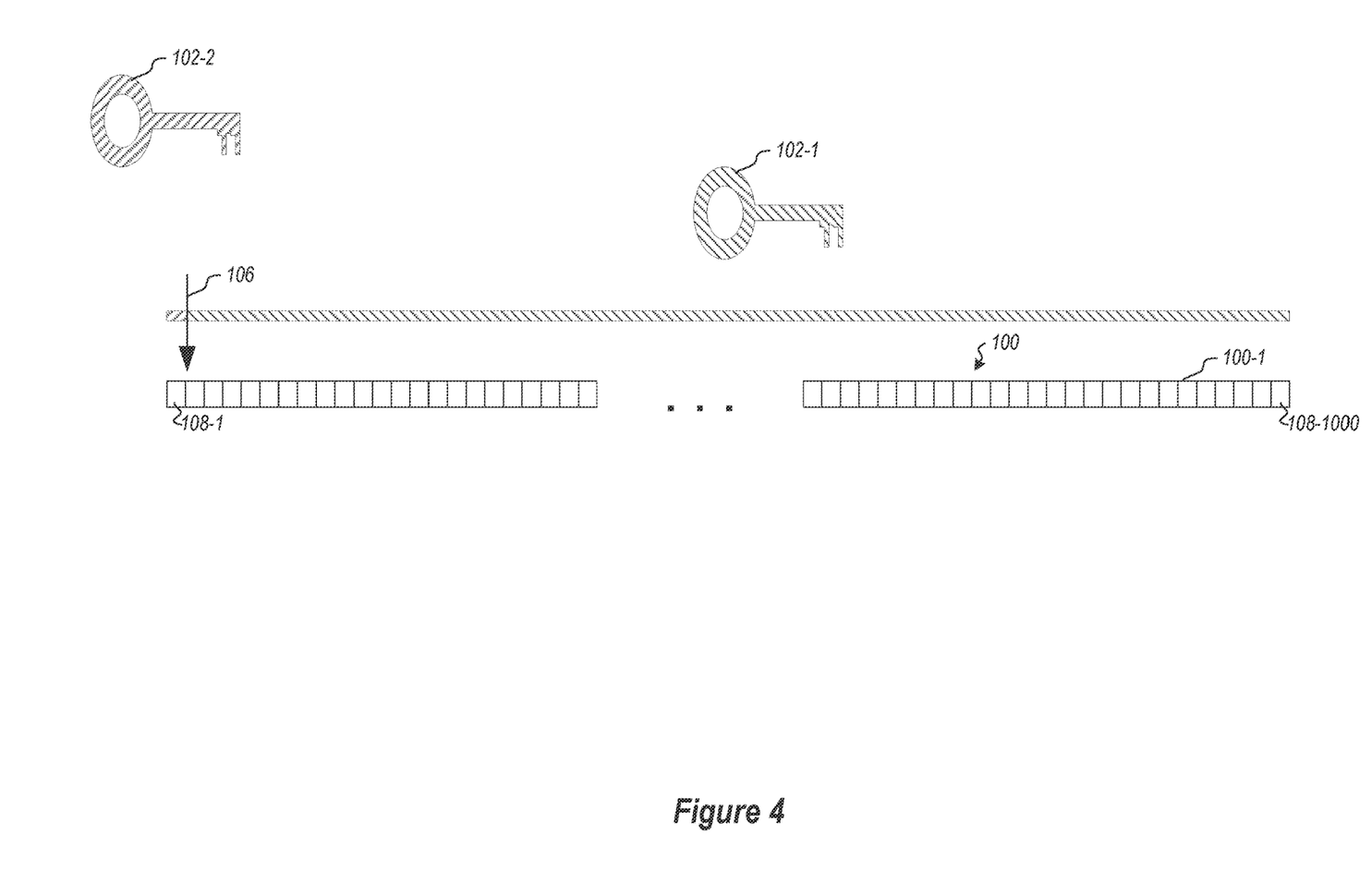
FIG. 4 illustrates an example illustrating where the occurrence of certain number of memory writes may be selected as an event for rolling a key in a slot.

In one of the examples illustrated above, the entirety of the memory region 100 will have been rolled from the first key 102-1 to the second key 102-2 in half the number of total memory reads before a key wears out. In particular, in the example illustrated, the entirety of the memory region 100 will have been rolled from the first key 102-1 to the second key 102-2 after 500,000 write operations. This ensures that there is no possibility of compromising either of the keys. Reference to FIG. 4 illustrates a worst case scenario. In FIG. 4, assume that 500,000 operations are performed on slot 100-1 using key 102-2 followed by 500,000 write operations performed on the memory slot 100-1000 using key 102-2. In this case, to assure that key 102-2 does not have any possibility to "wear out", the key roll must occur within 500,000 writes.

However, in other embodiments, the number of writes that can be performed may be greater than half of the number of operations to wear out a key. One example of where this can be accomplished is when a statistical analysis is used to determine a probability of using a worn out key on a memory operation. In particular, as alluded to previously herein, the only time when a worn out key will be used for a memory write on a write that occurs at the 1,000,001$^{st}$ write, in the example above, is if 500,001 writes are performed at a first slot and 500,000 writes are performed at a different second slot (or vise versa), without performing writes on another slot, before keys can be rolled. However, it is unlikely that this many writes will occur to these two slots before writes are performed on other slots. Thus, some embodiments may use statistical analysis tied to number of writes in a memory region to determine the likelihood that a worn out key would be used to perform write operations in the memory region. That is, embodiments may determine the number of memory writes or amount of time based on a probability of using a worn out key for a write the memory region being below a predetermined threshold.

Thus, in some embodiments, events based on number of writes may be based on statistical probabilities that slots will be written to such that a complete roll of a memory region from one key to another key may be something more than half of the total number of write operations to wear out a key, assuming two keys active at any given time in the memory region 100.

Note that some embodiments may be implemented where the memory region is encrypted using authentication tags. In some such examples, encryption is performed on a cache line basis. For example, 512 bits of data in a cache line are encrypted using an encryption algorithm. For each 512 bits of encrypted data 128 bits of metadata are stored. 96 of those bits may be an authentication tag, which is a string of bits generated using a signing algorithm that takes as input the 512 bits of data and a key to generate an authentication tag. When data is decrypted, the authentication tag can be used to ensure that the decrypted data matches the original input data.

1 bit is used to indicate if the cache line contains data or instructions. The remaining 31 bits comprise a nonce value, sometimes referred to as a count value. The nonce value can be applied, along with the data in the cache line, to the encryption algorithm to generate the 512 bits of encrypted data. The magnitude of the nonce value, in some embodiments, determines how quickly an encryption key wears out.

In particular, in some embodiments, each time a write is performed to the memory region (and hence an encryption operation), the nonce value is incremented by 1. Thus, there are $31^2$ nonce values, meaning that a key is good for $31^2$ writes before the key is worn out. Thus, in embodiment where key rolling needs to be performed for all slots in a memory region at ½ of the number of writes before the key is worn out, all slots will have a key rolled by the time $30^2$ writes have been performed on the memory region. AES-GCM encryption/decryption schemes use functionality similar to this illustration.

As noted, the number of writes before all slots in a region have had their key rolled can be more than ½ of the number of writes before the key is worn out by using certain statistical analysis as discussed previously.

In some embodiments, nonce preservation operations can be implemented to conserve nonce values and increase the number of writes that can occur before a key wears out. The guiding principle is that a given nonce value is only used once at a given address. In other words, for a given write to memory, so long as the nonce value or the address is "fresh" there is no risk of the key being compromised.

In one example, the same nonce value can be used so long as writes use increasing addresses. When a write occurs at a same lower address value than a current address, then the nonce value is incremented to ensure that there is no risk of a nonce value being reused, and thus a new nonce value is used at the lower address.

In alternative embodiments, nonce values will only be incremented if a write occurs at a same or higher address than the most recent previous write. In this scheme, it is known that different nonce values will be used when replacing data at lower address values than was originally used at those lower values, because the nonce was incremented from the nonce used at the lower address value to perform a write at a higher address value.

In these embodiments, the number of writes before a key is rolled in a slot may be variable based on the number of nonce values and the number of slots in a memory region. In particular, keys are rolled based on the number of nonce values used irrespective of the writes to the memory region. That is, keys are rolled per slot or per group of slots based on a predetermined (or variable if statistical analysis is used) number of nonce values having been used. The number of nonce values is based on the number of slots in the memory region and the total number of slots in the memory region and is determined such that a key is either guaranteed not to wear out or is sufficiently unlikely to wear out based on a statistical analysis and threshold evaluation.

Some embodiments are configured to implement collision mitigation functionality. In a simplest embodiment, all transactions related to the slot are allowed to complete and then all applications or other external entities are blocked until a key is rolled at a given slot. That is, external entities may be blocked from accessing the memory region when a key roll at any slot is occurring. Note that outstanding transactions concerning a slot to be rolled should be allowed to complete to prevent a situation where data would become unreadable as a result of being encrypted with a different key in the middle of a transaction.

Figure 5:
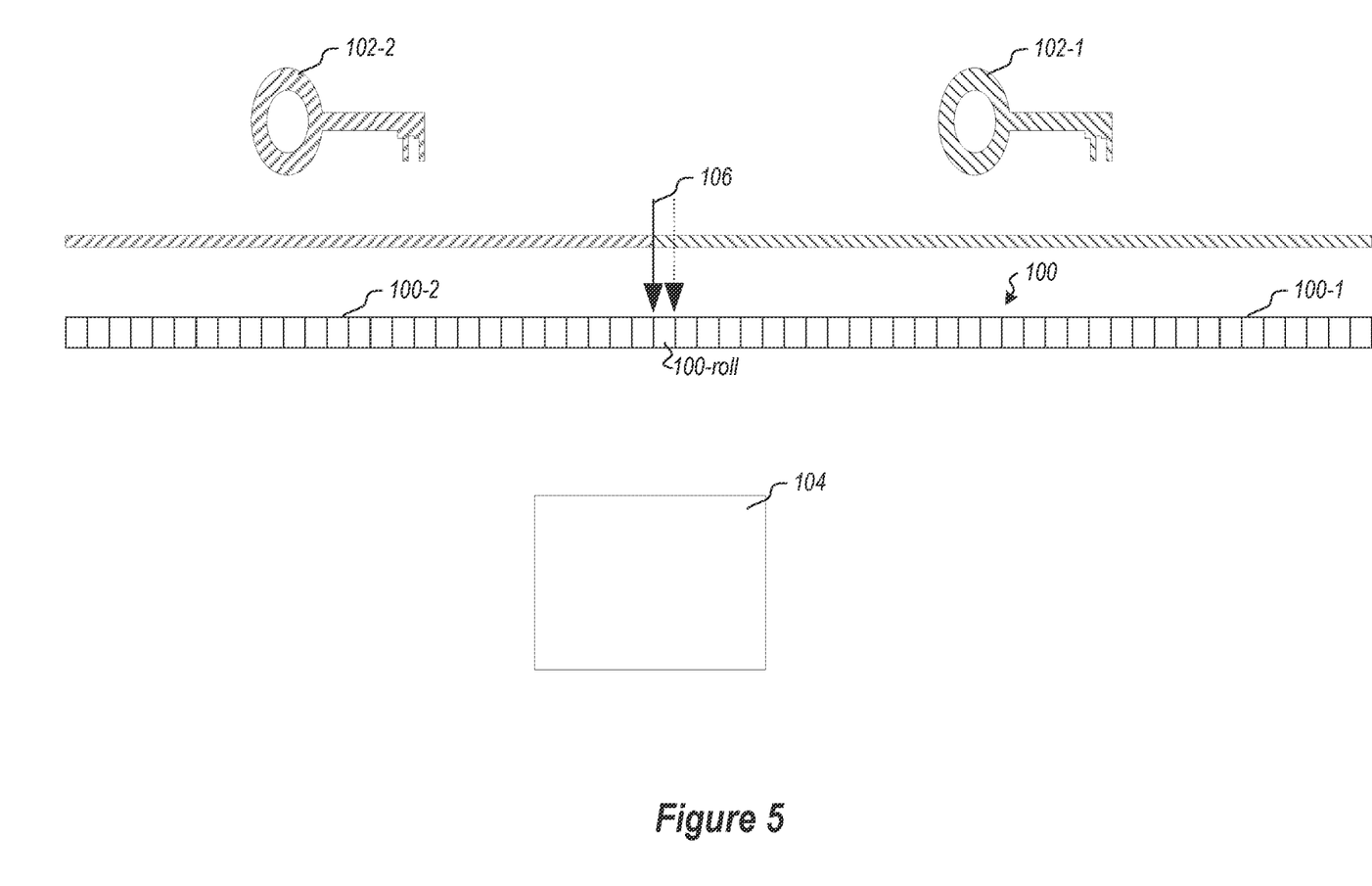
FIG. 5 illustrates the memory region and a process of rolling a key for a slot.
Figure 6:
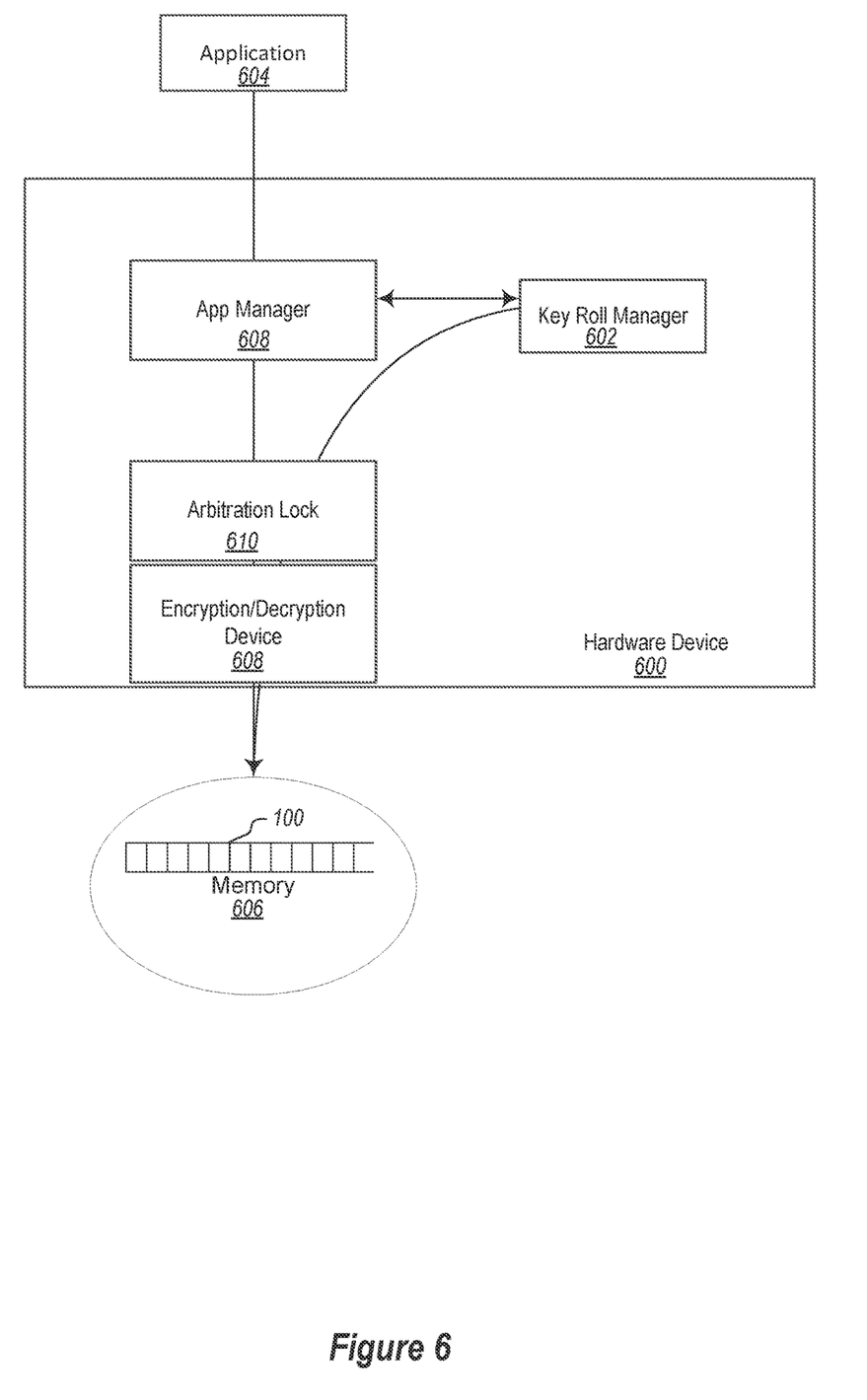
FIG. 6 illustrates collision mitigation functionality.

However, in other embodiments, certain efficiencies can be implemented that allow the slot to be more readily accessible. In particular, it may be such that the external entity 104 is attempting to access a rolling location, where the rolling location is the slot in the memory 100 where encryption is being changed from the first key 102-1 to the second key 102-2. For example, as illustrated in FIG. 5, an event has occurred which indicates that the key should be rolled at the slot 100-roll. Therefore, the slot 100-roll is encrypted using the first key 102-1, but needs to be re-encrypted to the second key 102-2. As illustrated in FIG. 6, this will typically occur by a hardware device 600 reading the slot 100-roll in the memory 606 using the first key 102-1, rewriting the read data to the slot 100-roll using the second key 102-2, and moving the pointer 106. If the external entity 104 (which is often a software application running on a hardware device) attempts to write to the slot 100-roll while the key is being rolled, this can create a situation where data may be unreadable. Thus, embodiments implement collision management to prevent this from occurring.

As illustrated in FIG. 6, a hardware device 600 includes a key roll manager 602 which is configured to perform the key roll operation on the memory region 100 in the hardware memory 606. The key roll manager 602 is implemented by executing executable instructions using one or more processors at the hardware device 600. The key roll manager 602 uses the encryption/decryption device 608, which holds the keys 102-1 and 102-2, to read and write to the memory region 100 in the memory 606. The encryption/decryption device 608 is implemented, in some embodiments, by executing certain executable instructions on one or more processors at the hardware device 600 and using one or more secure storage locations to store the keys 102-1 and 102-2. As noted above, the key roll manager 602 rolls keys by reading the slot at the rolling location using the first key 102-1 and rewriting the data at the slot at the rolling location using the second key 102-2. This is performed using the encryption/decryption device 608. In some embodiments, the encryption/decryption device 608 is able to implement AES-GCM encryption/decryption schemes.

Two factors are considered in collision mitigation. A first factor relates to an application 604 or other external entity attempting to access memory at the rolling location, and in particular in the slot 100-roll. The second factor relates to existence of transactions that have not been completed related to memory in the slot 100-roll.

With respect to the first factor, an application manager 608, which is a programmatic entity running executable instructions on computer processors at the hardware device 600, is able to receive requests from the key roll manager 602, to roll keys in the slot 100-roll, and to grant or deny the request to roll keys in the slot 100-roll. In particular, the application manager 608 is able to communicate with the application 604, as well as other applications or external entities attempting to write to the slot 100-roll. If there are attempts by applications to write to the slot 100-roll, the application manager 608 will deny requests from the key roll manager 602 to roll the keys at the slot 100-roll. If the application manager 608 is not aware of any applications attempting to write to the slot 100-roll, then the application manager 608 will grant the request to the key roll manager 602 to roll the keys at the slot 100-roll. Note that the application manager 608 will also prevent any external entities from reading and writing to the slot 100-roll so long as the key roll manager 602 is performing a key roll on the slot 100-roll. The application manager will allow writes to other slots that do not concern slot 100-roll to be performed, thus reducing the amount of time when an application cannot access the memory.

Note also that the application manager 608 is in communication with the arbitration lock 610 so that the application manager 608 is aware of transactions that are open and concern the slot 100-roll, such that the grant to the key roll manager 602 can be based on open transactions. Specifically, so long as there are open transactions that concern the slot 100-roll, the application manager 608 will not grant access to the key roll manager 602 to roll the key at the slot 100-roll. The arbitration lock 610 may include storage for listing open transactions and programmatic functionality for controlling access to the memory 606. The arbitration lock can block requests from the key roll manager 602 from accessing the slot 100-roll if any transactions are open that will need to access the slot 100-roll. Once all transactions that need to access the slot 100-roll are committed, the arbitration lock 610 can allow the key roll manager 602 to roll keys at the slot 100-roll in the memory region 100 of the memory 606.

Once the key roll manager 602 has completed key rolling on the slot 100-roll, the key roll manager will remove the request to perform key rolling, and the application manager 608 can remove its grant and can then allow external entities such as the application 604 to write to the slot 100-roll.

In some embodiments, the key roll manager 602 includes functionality to broadcast or otherwise provide information identifying the location in memory of the slot 100-roll. In some embodiments, this can be accomplished by the key roll manager 602 maintaining a register where the key roll manager 602 can store the physical address of the slot 100-roll. This register is available to be viewed by other entities such as the application manager 608, or other entities as appropriate.

With respect to the key roll manager 602 requesting authorization from the app manager 608 to roll keys and the app manager 608 granting that request to the key roll manager 602 various modalities may be implemented to implement this functionality. For example, in some embodiments, the key roll manager 602 may maintain a single bit register that when set (or alternatively when cleared if different logic is used) indicates a request for rolling keys. Similarly, the app manager 608 may maintain a single bit register that when set (or alternatively when cleared if different logic is used) indicates a grant of the request to the key roll manager 602. Alternatively, other modalities may be implemented such as interrupts, dedicated pins on a chip, or other functionality.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
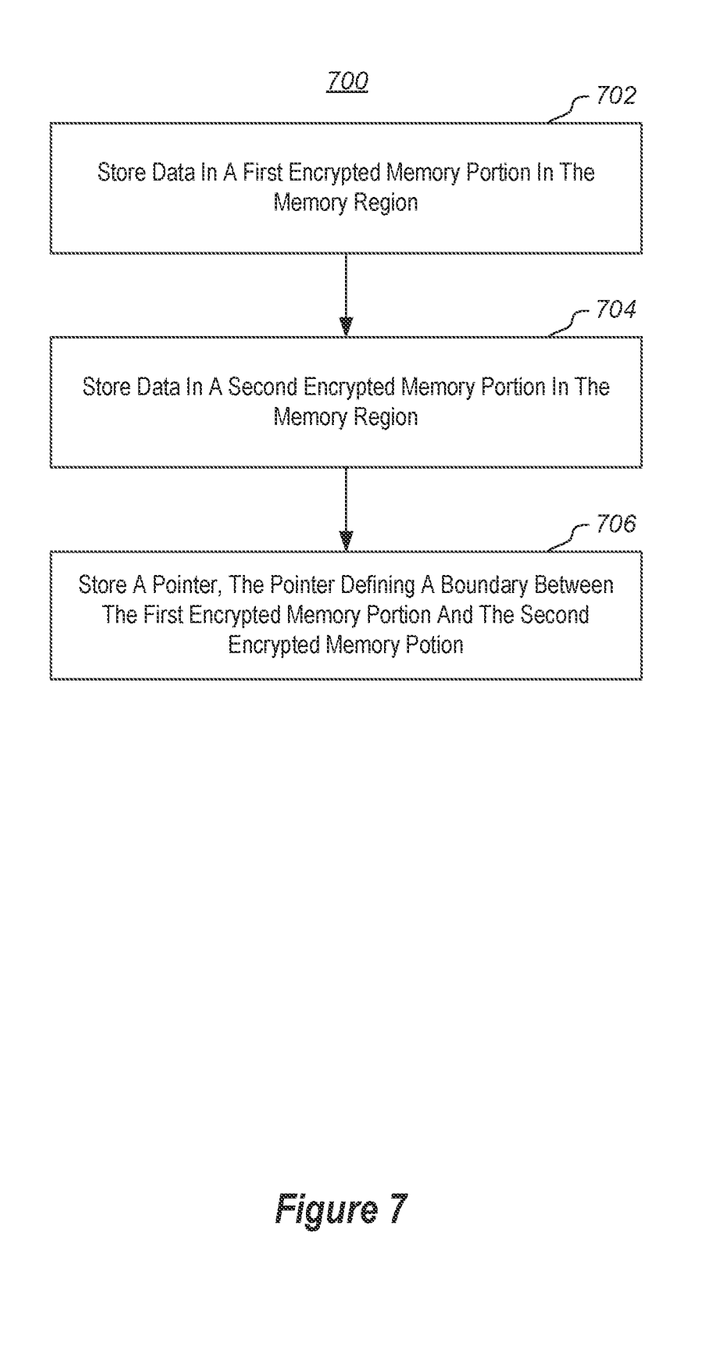
FIG. 7 illustrates a method of rolling a key within a memory region.

Referring now to FIG. 7, a method 700 is illustrated. The method 700 includes acts for rolling a key within a memory region. The method includes storing data in a first encrypted memory portion in the memory region (act 702). The data in the first encrypted memory portion is encrypted to a first runtime encryption key.

The method 700 further includes storing data in a second encrypted memory portion in the memory region (act 704). The data in the second encrypted memory portion is encrypted to a second runtime encryption key.

The method 700 further includes storing a pointer, the pointer defining a boundary between the first encrypted memory portion and the second encrypted memory portion (act 706).

The first encrypted memory portion and second encrypted memory portion are both configured to be accessible together to entities external to the memory to provide data stored in the first encrypted memory portion and second encrypted memory portion. That is, embodiments may be implemented where an external entity such as software can selectively access either the first encrypted memory portion or the second encrypted memory portion based on programmatic instructions, in spite of the different encrypted memory portions being encrypted using different runtime encryption keys.

The method 700 may further include identifying occurrence of an event indicating that a memory slot adjacent to the pointer should have its key rolled from the first runtime encryption key to the second runtime encryption key. Such embodiments may, as a result, read slot data in the slot using the first runtime encryption key; write the slot data to the slot using the second runtime encryption key; and move the pointer such that the slot is in the second encrypted memory portion.

In some such embodiments, the event is based on a certain amount of time elapsing.

In alternative, or additional embodiments, the event is based on a certain number of writes on the memory region having been performed. In some such embodiments, the certain number of writes is a number of writes that is no more than ½ of a number of writes to wear out the first runtime encryption key or the second runtime encryption key. In an alternative or additional embodiment, the certain number of writes is a number of writes that is based on a statistical probability of wearing out the first runtime encryption key or the second runtime encryption key. In an alternative or additional embodiment, the certain number of writes is based on encryption of the memory region using an incrementable nonce. In an alternative or additional embodiment, the certain number of writes is variable. In an alternative or additional embodiment, the certain number of writes is variable based on results of nonce preservation operations.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of rolling a key within a memory region, the method comprising:
   storing data in a first encrypted memory portion in the memory region, the data in the first encrypted memory portion being encrypted to a first runtime encryption key;
   storing data in a second encrypted memory portion in the memory region, the data in the second encrypted memory portion being encrypted to a second runtime encryption key;
   storing a pointer, the pointer defining a boundary between the first encrypted memory portion and the second encrypted memory portion;
   wherein the first encrypted memory portion and second encrypted memory portion are both configured to be accessible together to entities external to the memory to provide data stored in the first encrypted memory portion and second encrypted memory portion; and rolling the first encrypted memory portion into the second encrypted memory portion by iteratively:

reading data in one or more slots in the first encrypted memory portion using the first runtime encryption key;

writing the data to the one or more slots using the second runtime encryption key; and moving the pointer such that the one or more slots are in the second encrypted memory portion; and wherein rolling the first encrypted memory portion into the second encrypted memory portion is performed by performing each iteration based on a memory regions size and number of operations to wear out a key such that all slots in the first encrypted memory portion have been rolled to the second encrypted memory portion such that a quantity of memory operations performed on the first encrypted memory portion is no more than ½ of the number of memory operations to wear out the first key.

2. The method of claim 1, further comprising implementing collision mitigation functionality whereby all transactions related to a given slot are allowed to complete and then all applications or other external entities are blocked from accessing the given slot until a key is rolled at the given slot.

3. The method of claim 1, further comprising implementing collision mitigation functionality whereby external entities are blocked from accessing the first encrypted memory portion when a key roll at any slot in the first encrypted memory portion is occurring.

4. The method of claim 1, further comprising implementing collision mitigation functionality whereby key rolling is prevented for a particular slot while applications are attempting to write to the slot.

5. The method of claim 1, further comprising implementing collision mitigation functionality whereby key rolling is prevented for a particular slot while transactions are open for the slot.

6. The method of claim 1, further comprising broadcasting a location of a slot for which a key roll is to occur.

7. A system for rolling encryption within a memory, the system comprising:

a first encrypted memory portion in the memory, the first encrypted memory portion encrypted with a first runtime encryption key;

a second encrypted memory portion in the memory, the second encrypted memory portion encrypted with a second runtime encryption key;

a pointer stored within a hardware device, the pointer defining a boundary between the first encrypted memory portion and the second encrypted memory portion a key roll manager configured to roll the first encrypted memory portion into the second encrypted memory portion by iteratively:

reading data in one or more slots in the first encrypted memory portion using the first runtime encryption key;

writing the data to the one or more slots using the second runtime encryption key; and moving the pointer such that the one or more slots are in the second encrypted memory portion; and wherein rolling the first encrypted memory portion into the second encrypted memory portion is performed by performing each iteration based on a memory regions size and number of operations to wear out a key such that all slots in the first encrypted memory portion have been rolled to the second encrypted memory portion such that a quantity of memory operations performed on the first encrypted memory portion is no more than ½ of the number of memory operations to wear out the first key.

8. The system of claim 7, further comprising a key roll manager and an app manager configured to implement collision mitigation functionality whereby all transactions related to a given slot are allowed to complete and then all applications or other external entities are blocked from accessing the given slot until a key is rolled at the given slot.

9. The system of claim 7, further comprising a key roll manager and an app manager configured to implement collision mitigation functionality whereby external entities are blocked from accessing the first encrypted memory portion when a key roll at any slot in the first encrypted memory portion is occurring.

10. The system of claim 7, further comprising a key roll manager and an app manager configured to implement collision mitigation functionality whereby key rolling is prevented for a particular slot while applications are attempting to write to the slot.

11. The system of claim 7, further comprising a key roll manager and an app manager configured to implement collision mitigation functionality whereby key rolling is prevented for a particular slot while transactions are open for the slot.

12. The system of claim 7, further comprising a key roll manager configured to broadcast a location of a slot for which a key roll is to occur.

13. The system of claim 7, wherein the system is configured to use a same nonce value so long as a write occurs to a higher address value than a current write location and to increment the nonce when writes occur to a same or lower address value than a current write location.

14. The system of claim 7, wherein the system is configured to use a same nonce value so long as a write occurs to a lower address value than a current write location and to increment the nonce when writes occur to a same or higher address value than a current write location.

15. A computing system comprising:

one or more processors; and one or more computer-readable media devices having stored thereon instructions that are executable by the one or more processors to configure the computer system to roll a key within a memory region, including instructions that are executable to configure the computer system to perform at least the following:

store data in a first encrypted memory portion in the memory region, the data in the first encrypted memory portion being encrypted to a first runtime encryption key;

store data in a second encrypted memory portion in the memory region, the data in the second encrypted memory portion being encrypted to a second runtime encryption key;

store a pointer, the pointer defining a boundary between the first encrypted memory portion and the second encrypted memory portion; and wherein the first encrypted memory portion and second encrypted memory portion are both configured to be accessible together to entities external to the memory to provide data stored in the first encrypted memory portion and second encrypted memory portion; and roll the first encrypted memory portion into the second encrypted memory portion by iteratively:

reading data in one or more slots in the first encrypted memory portion using the first runtime encryption key;

writing the data to the one or more slots using the second runtime encryption key; and moving the pointer such that the one or more slots are in the second encrypted memory portion; and wherein rolling the first encrypted memory portion into the second encrypted memory portion is performed performing each iteration based on a memory regions size and number of operations to wear out a key such that all slots in the first encrypted memory portion have been rolled to the second encrypted memory portion such that a quantity of memory operations performed on the first encrypted memory portion is no more than ½ of the number of memory operations to wear out the first key.

16. The computing system of claim 15, wherein the one or more computer-readable media devices further have stored thereon instructions that are executable by the one or more processors to configure the computer system to implement collision mitigation functionality whereby all transactions related to a given slot are allowed to complete and then all applications or other external entities are blocked from accessing the given slot until a key is rolled at the given slot.

17. The computing system of claim 15, wherein the one or more computer-readable media devices further have stored thereon instructions that are executable by the one or more processors to configure the computer system to implement collision mitigation functionality whereby external entities are blocked from accessing the first encrypted memory portion when a key roll at any slot in the first encrypted memory portion is occurring.

18. The computing system of claim 15, wherein the one or more computer-readable media devices further have stored thereon instructions that are executable by the one or more processors to configure the computer system to implement collision mitigation functionality whereby key rolling is prevented for a particular slot while applications are attempting to write to the slot.

19. The computing system of claim 15, wherein the one or more computer-readable media devices further have stored thereon instructions that are executable by the one or more processors to configure the computer system to implement collision mitigation functionality whereby key rolling is prevented for a particular slot while transactions are open for the slot.

20. The computing system of claim 15, wherein the one or more computer-readable media devices further have stored thereon instructions that are executable by the one or more processors to configure the computer system to broadcast a location of a slot for which a key roll is to occur.

* * * * *